G. LEUFFGEN.
Melting and Manufacture of Glass.
No. 214,572. Patented April 22, 1879.
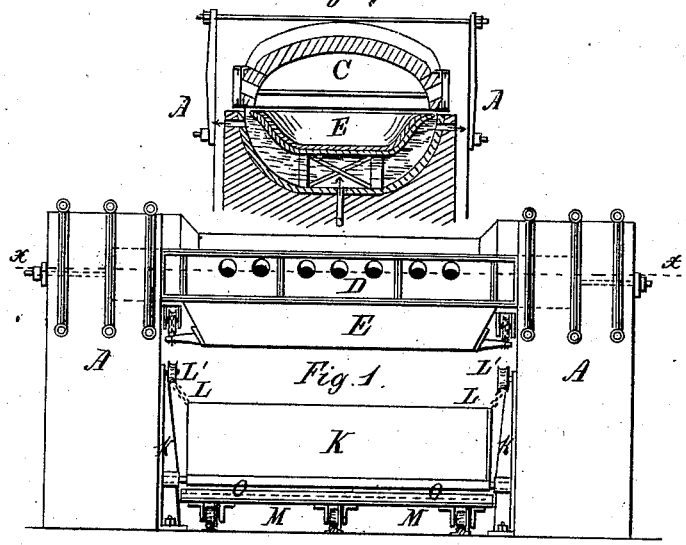
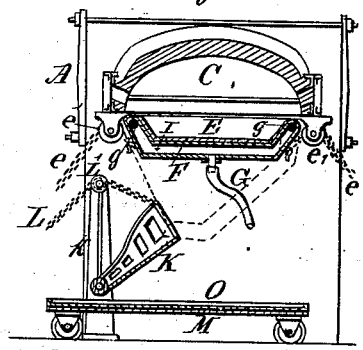
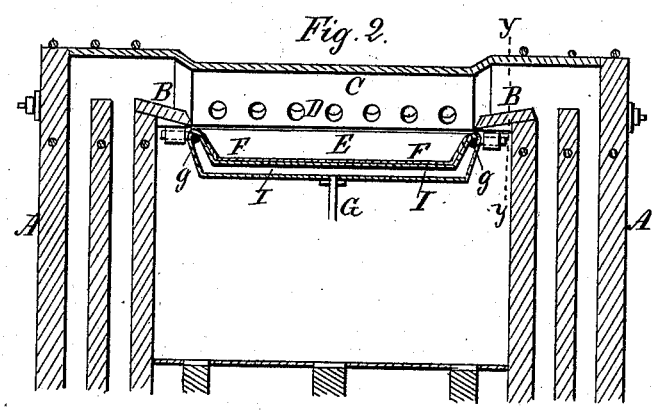
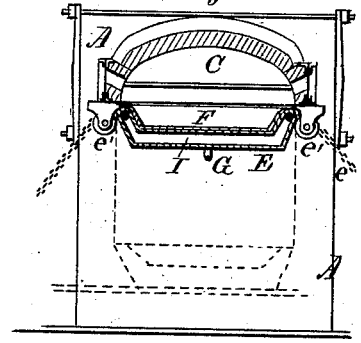
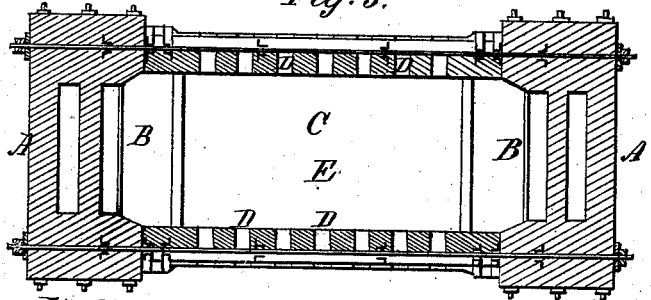
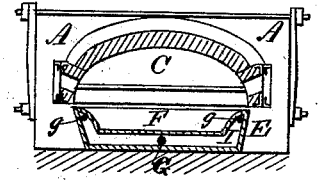
Witnesses.
Alf. L. Leonard
Henri Guillaume
Inventor
George Leuffgen
pr Henry Orth
atty.

UNITED STATES PATENT OFFICE.

GEORGE LEUFFGEN, OF BERLIN, PRUSSIA, GERMAN EMPIRE.

IMPROVEMENT IN THE MELTING AND MANUFACTURE OF GLASS.

Specification forming part of Letters Patent No. 214,572, dated April 22, 1879; application filed December 26, 1878.

*To all whom it may concern:*

Be it known that I, GEORGE LEUFFGEN, of the city of Berlin, in the Kingdom of Prussia and German Empire, have invented new and useful Improvements in the Manufacture of Glass, of which the following is a specification.

My invention consists in melting glass in a receiver or pot made of or lined with the same material.

The invention further consists in melting glass in a receiver or pot made of the same material, and kept from melting by the application of a cooling agent.

The invention further consists in the peculiar construction of melting pots or receivers for the melting of glass, all as hereinafter described, and shown in the accompanying drawings, in which—

Figure 1 is an elevation; Fig. 2, a longitudinal vertical section; Fig. 3, a longitudinal transverse section on line $x\,x$ of Fig. 1, and Figs. 4 and 5 sections on line $y\,y$ of Fig. 2, of a glass furnace, illustrating my improved process and means for carrying into effect. Figs. 6 and 7 are sections of the furnace, illustrating modifications of arrangement.

A represents the smelting-furnace. B is the fire-bridge. C is the combustion-chamber, and D the working-holes, all constructed and arranged in the usual manner. E is the melting-pot, suspended upon trunnions or chains $e$ underneath the combustion-chamber C, and, as will be readily understood, said melting-pot takes the place of the usual sole, which is here dispensed with.

The chains $e$ are made to run over pulleys $e'$, their ends being made fast in any convenient manner to retain the melting-pot in proper position or lower it from under the furnace-chamber when it is desired to convey it to some other part of the glass-works. By means of this arrangement of chains and pulleys one end of the melting-pot E can be lowered and the contents transferred therefrom either to another vessel or to a mold or molds, as illustrated by Figs. 4 and 5.

The melting-pots for glass now employed are constructed of refractory clay, or a mixture of such with other refractory substances, or of chamotte, and the admixture of these substances with the glass cannot be avoided, however careful the operator may be. The product obtained by the old method of melting glass is consequently more or less impure. To avoid this, and to obtain a product free from earthy impurities, I employ melting-pots preferably made of iron and lined with glass of any description for general purposes. When finer grades of glass, however, are to be produced, I form the lining of the melting-pots of glass of the same nature as that to be melted therein.

The melting-pots E are made with double walls to form a chamber, I, and the latter is provided with induction and eduction pipes G $g$, respectively, whereby a constant current of cold water, cold air, or other refrigerant may be maintained within the chamber I for the purpose of keeping the glass lining F from melting with the glass contained in the pot E.

In the drawings I have illustrated the melting-pots as being fed from below by a refrigerant which is exhausted at top. This arrangement may be reversed if found expedient or necessary, according to the refrigerant employed, and the feed and exhaust pipes may be located upon any part of the melting-pot, as convenience or necessity may demand.

The cooling of the melting-pot is greatly facilitated by dispensing with the sole of the furnace and employing the pot itself in lieu thereof. In this manner the contents of the melting-pot only are exposed to the heat of the furnace, as will be readily understood by an inspection of the drawings. The rim or border of the melting-pot is made to fit the under side of the side walls of the combustion-chamber C and the under side of the projecting fire-bridges B, so that the upper faces of the rim or border of the melting-pot are shielded from the heat. It will, of course, be understood that a series of pots may be employed, in which case transverse walls are formed in the bottom of the combustion-chamber C, to protect the upper face of the walls of said pots, which are made to fit the under side of the partition-walls.

In the casting of glass, especially in the casting of plate-glass, I employ a casting-bridge, K, pivoted at one end to standards $k$, and connected at the other or outer end to a chain, L, running over a pulley, L', mounted in the upper end of the standard k. The casting-bridge is made of iron, or fire-clay, or chamotte. If made of iron it is preferably made hollow.

The mold O, for the plate-glass, consists of a highly-polished metallic plate, which, like the bridge k, is heated previous to casting for obvious reasons, and when so heated placed upon a truck, M, mounted upon a suitable track, and is run under the melting-pot. The latter is now lowered at one end until its edge rests upon the outer edge of the casting-bridge K, which has been elevated sufficiently to prevent the molten glass from running out of the pot in too great a volume, and as the pot is emptied the bridge is lowered until all the glass, or the required quantity of glass, has been poured out upon the mold O and formed into a sheet or plate of glass. The truck may then, together with the mold and glass plate, be run into the annealing furnace or arch.

For casting small articles, I provide the smelting-pots with means for tapping them, and cause a stream of glass to flow into the mold of the volume desired. Any suitable means may be employed for this purpose.

The use of the casting-bridge in casting plate-glass enables me to transfer the molten material in an even sheet upon the mold and obtain plate-glass which does not require polishing afterward. This arrangement is plainly shown in Figs. 1 and 4. Instead of suspending the melting-pot under the combustion-chamber, as shown by Figs. 1, 2, 3, 4, and 5, the furnace may be provided with a sole, and the pot or pots placed thereon, and suitable means employed to conduct a refrigerant into and through the chamber F for the purpose above stated. The double-walled pots may also be dispensed with, and single-walled pots suspended or resting in a cooling-chamber formed in the sole of the furnace may be employed, as shown by Figs. 6 and 7 respectively.

It will be understood that I do not wish to limit myself to the exact form or configuration of melting-pot shown, as this form may be varied without departing from the nature of my invention.

The process hereinbefore described and the means shown or other suitable means may be adapted to the melting of other substances than glass, which have heretofore been melted in crucibles, receivers, or upon hearths made of earthy substances exclusively, or a mixture of earthy and other substances, by melting such in crucibles, receivers, or upon hearths constructed of or lined with the same substance as that to be melted therein or thereon.

Having now described my invention, what I claim, and desire to secure by Letters Patent, is—

1. The process of melting glass which consists in melting the same in an inclosing-wall of the same material, substantially as and for the purpose specified.

2. The process of melting glass which consists in melting the same in an inclosing-wall of the same material surrounded by a cooling agent, as and for the purpose specified.

3. A melting-pot for glass provided with an interior shell of the same material, substantially as and for the purpose specified.

4. A melting-pot for glass having an interior shell of glass, and surrounded by an exterior chamber for the purpose of cooling the interior glass shell and preventing its melting with the glass contained therein, as set forth.

5. A melting-pot for glass, made of metal, and having double walls forming a surrounding cooling-chamber and an interior lining of glass, substantially as and for the purpose specified.

6. In the manufacture of glass, a furnace without a sole, in combination with a melting-pot arranged to take the place of said sole, as and for the purpose specified.

7. In the manufacture of glass, a suspended melting-pot adapted to be lowered from and raised to the furnace or tilted, to remove said melting-pot, or transfer its contents into a mold, as described, for the purpose specified.

In witness whereof I have hereunto signed my name in the presence of two subscribing witnesses.

GEORGE LEUFFGEN.

Witnesses:
ROBERT GOTTHEIL,
BERTHOLD ROI.